US006598345B1

(12) United States Patent
Arimoto et al.

(10) Patent No.: US 6,598,345 B1
(45) Date of Patent: Jul. 29, 2003

(54) WINDOW REGULATOR HAVING A CAM MEMBER FOR LATERAL ADJUSTMENT

(75) Inventors: Shigeki Arimoto, Auburn Hills, MI (US); Brian D. Williams, St. Clair, MI (US)

(73) Assignee: Hi-Lex Corporation, Battle Creek, MI (US)

( * ) Notice: Subject to any disclaimer, the term of this patent is extended or adjusted under 35 U.S.C. 154(b) by 0 days.

(21) Appl. No.: 09/935,074

(22) Filed: Aug. 22, 2001

(51) Int. Cl.[7] .............................. B60J 1/14; E05F 11/48

(52) U.S. Cl. .............................. 49/374; 49/352; 49/375

(58) Field of Search .......................... 49/375, 358, 374, 49/348, 349, 352; 52/716.5

(56) References Cited

U.S. PATENT DOCUMENTS

| | | | | |
|---|---|---|---|---|
| 4,237,657 A | | 12/1980 | Kazewych | |
| 4,706,412 A | | 11/1987 | Kobrehel | |
| 4,910,917 A | * | 3/1990 | Brauer | 49/348 |
| 4,991,351 A | | 2/1991 | Bertolini | |
| 5,469,663 A | | 11/1995 | TenBrink et al. | |
| 5,515,651 A | | 5/1996 | Hofmann et al. | |
| 5,622,005 A | * | 4/1997 | Ochenski et al. | 49/375 |
| 5,673,515 A | * | 10/1997 | Weber et al. | 49/352 |
| 5,729,930 A | * | 3/1998 | Schust et al. | 49/375 |
| 5,809,695 A | | 9/1998 | Strickland | |
| 6,021,604 A | * | 2/2000 | Sesselmann | 49/349 |
| 6,152,636 A | * | 11/2000 | Nass | 403/13 |

* cited by examiner

*Primary Examiner*—Gregory J. Strimbu
(74) *Attorney, Agent, or Firm*—Young & Basile, P.C.

(57) ABSTRACT

A window regulator mechanism for a motor vehicle door providing ready adjustability to accommodate manufacturing tolerances in the door glass guide channels receiving the side edges of the window glass or, in the case of a sashless door, to accommodate manufacturing tolerances in the seal carried by the vehicle body. Adjustability is provided by a cam member which is rotatly mounted on carrier plate of a carrier assembly and which coacts with a follower surface on a glass clip mounted on an upper edge of the carrier plate. The follower surface is provided as a cutout in a lower edge of a stabilizer portion of the glass clip whereby the stabilizer portion serves not only to preclude cocking of the glass clip relative to the carrier plate but also to provide the cam follower surface for coaction with the cam member carried by the carrier plate.

16 Claims, 5 Drawing Sheets

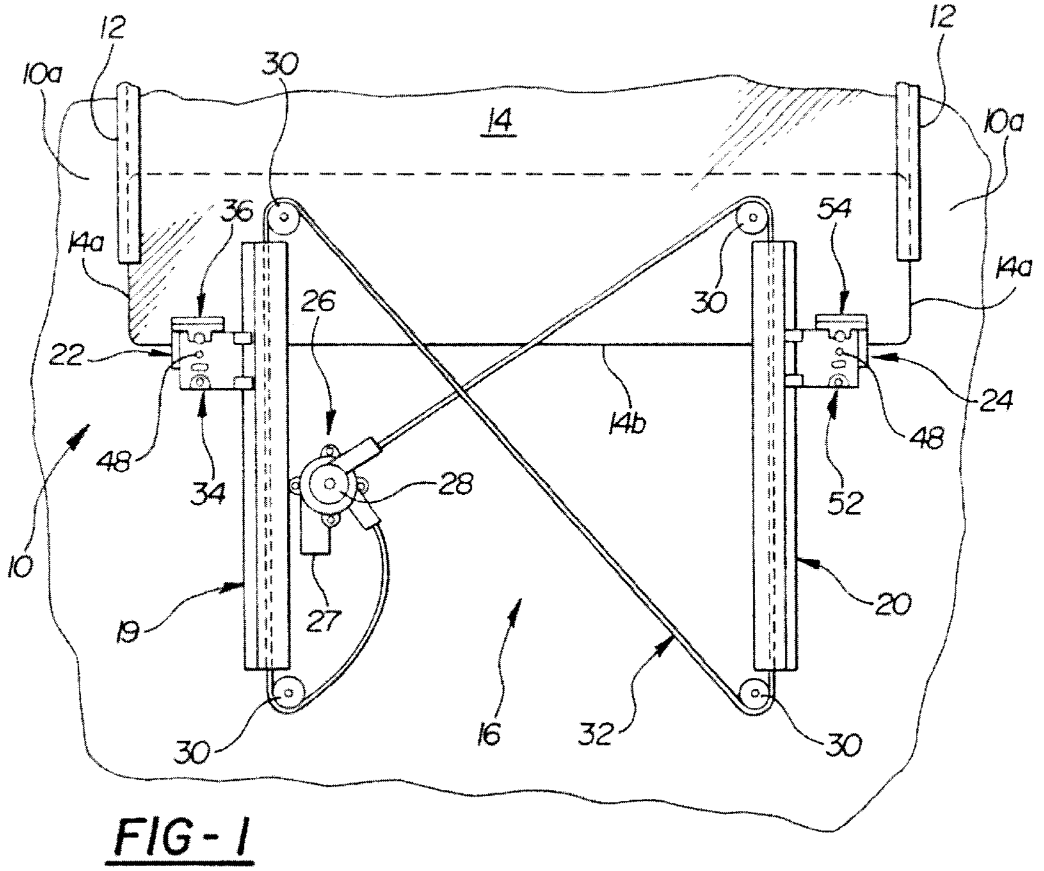
FIG-1
FIG-1A
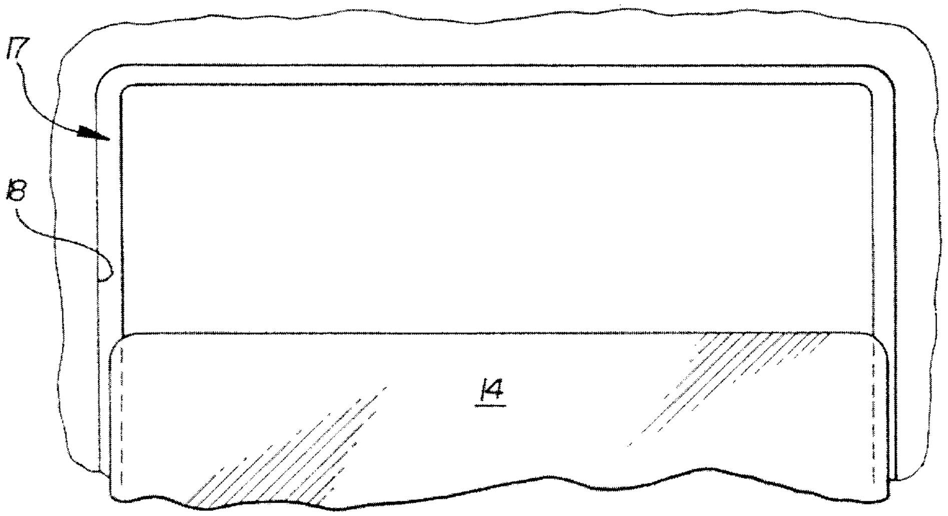

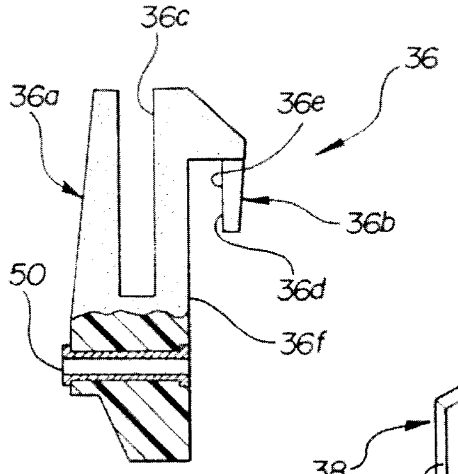
FIG - 4
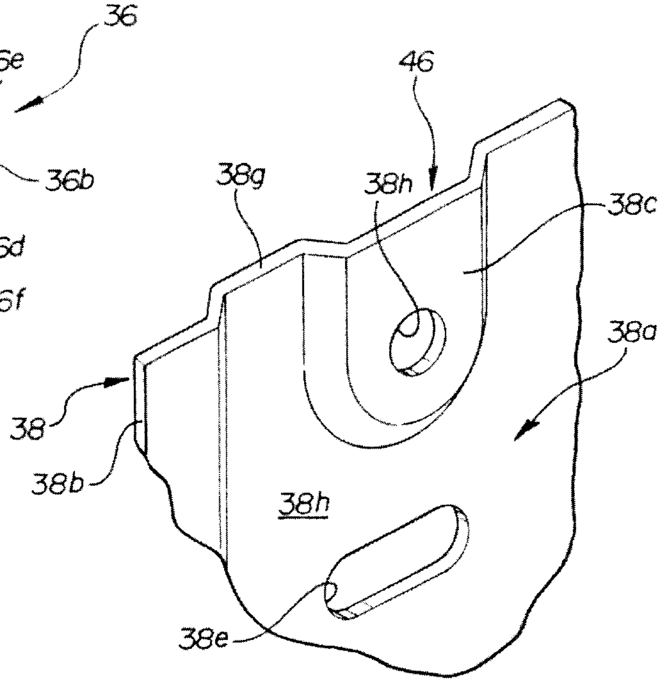
FIG - 5
FIG - 6
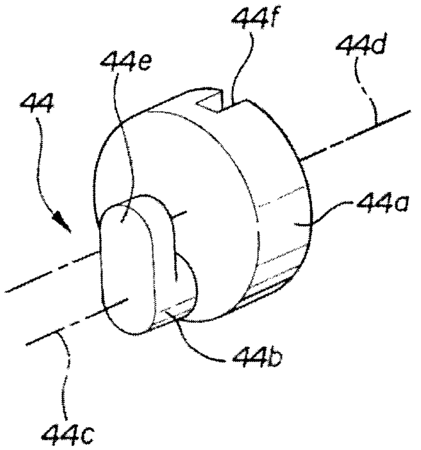
FIG - 7
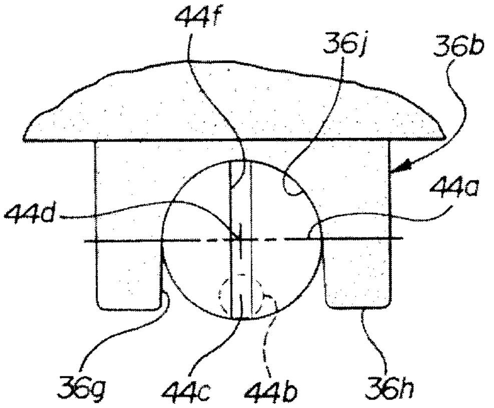

WINDOW REGULATOR HAVING A CAM MEMBER FOR LATERAL ADJUSTMENT

BACKGROUND OF THE INVENTION

This invention relates to motor vehicle window regulators and, more particularly, to window regulators providing adjustability to facilitate the installation procedure.

Window regulators for motor vehicles are in common usage. In a typical motor vehicle window regulator, the regulator functions to raise and lower the window glass with the side edges of the window glass either guiding in channels defined by the motor vehicle door structure or, in the case of a sashless door, coacting with a seal carried by the motor vehicle body structure. Because of manufacturing tolerances, it is important to provide a means of readily and effectively adjusting the window regulator mechanism to compensate for variations in the disposition of the door glass guide channels or the body seal relative to the window regulator mechanism.

SUMMARY OF THE INVENTION

An object of the present invention is to provide an improved motor vehicle window regulator mechanism.

A more specific object is to provide a motor vehicle window regulator mechanism having a ready and effective means to adjust the window regulator mechanism in compensation for variations in the placement of the door glass guide channels or the glass seal on the body structure.

The invention relates to a motor vehicle window regulator mechanism of the type including first and second spaced vertical guide rails, first and second carrier plate structures slidably mounted on the respective guide rails, guide means operative to move the carrier plate structures upwardly and downwardly on the guide rails, and first and second glass clips carried by the respective carrier plate structures and adapted to receive a lower edge of the window glass whereby to raise and lower the window glass in response to upward and downward movement of the carrier plate structures.

According to the invention, the regulator mechanism further includes a cam member mounted for movement on one of the first glass clip and first carrier plate structure and a coacting surface defined on the other of the first glass clip and first carrier structure and the cam member and coacting surface coact in response to movement of the cam member to move the first clip and thereby the window glass laterally with respect to the first carrier plate member. This arrangement provides a ready and effective means of laterally adjusting the window glass in compensation for motor vehicle manufacturing tolerances. In a preferred embodiment of the invention, the cam member is mounted for rotation on the first carrier plate structure and the coacting surface is defined on the first glass clip.

According to a further feature of the invention, the first carrier plate structure includes a carrier plate; the first glass clip defines an upwardly opening groove for receiving the lower edge of the window glass and a downwardly opening groove for receiving an upper edge of the carrier plate; the upwardly opening groove is defined by a main body portion of the first glass clip and the downwardly opening groove is defined by a surface of the main body portion coacting with a stabilizer portion extending downwardly in spaced parallel relation to the main body portion surface; and the coacting surface is defined on the stabilizer portion. The stabilizer portion of the glass clip thereby functions to not only stabilize the glass clip with respect to the carrier plate, but also provides a surface for coaction with the cam member.

According to a further feature of the invention, the coacting surface has an inverted U configuration and is defined by a cutout formed in a lower edge of the stabilizer portion. This specific arrangement facilitates the coaction between the cam and the coacting surface.

According to a further feature of the invention, the regulator mechanism further includes a fastener having a shaft portion received in an aperture in one of the first glass clip and first carrier plate structure and passing through a slot in the other of the first glass clip and first carrier plate structure. This shaft and slot arrangement facilitates and guides the lateral movement of the glass clip on the carrier plate structure. In a preferred embodiment of the invention, the fastener shaft passes through a slot in the first carrier plate structure for threaded receipt in a threaded aperture in the main body portion of the first glass clip.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a somewhat schematic view of a window regulator mechanism according to the invention installed in a sash type motor vehicle door structure;

FIG. 1A is schematic view of a sashless door structure;

FIG. 4 is an end view of the glass clip;

FIG. 5 is a fragmentary perspective view of a carrier structure forming a part of the carrier assembly;

FIG. 6 is a perspective view of a cam member forming a part of the carrier structure;

FIG. 7 is a detail view showing the coaction of the cam member and the glass clip;

DETAILED DESCRIPTION OF THE PREFERRED EMBODIMENTS

Figure 2:
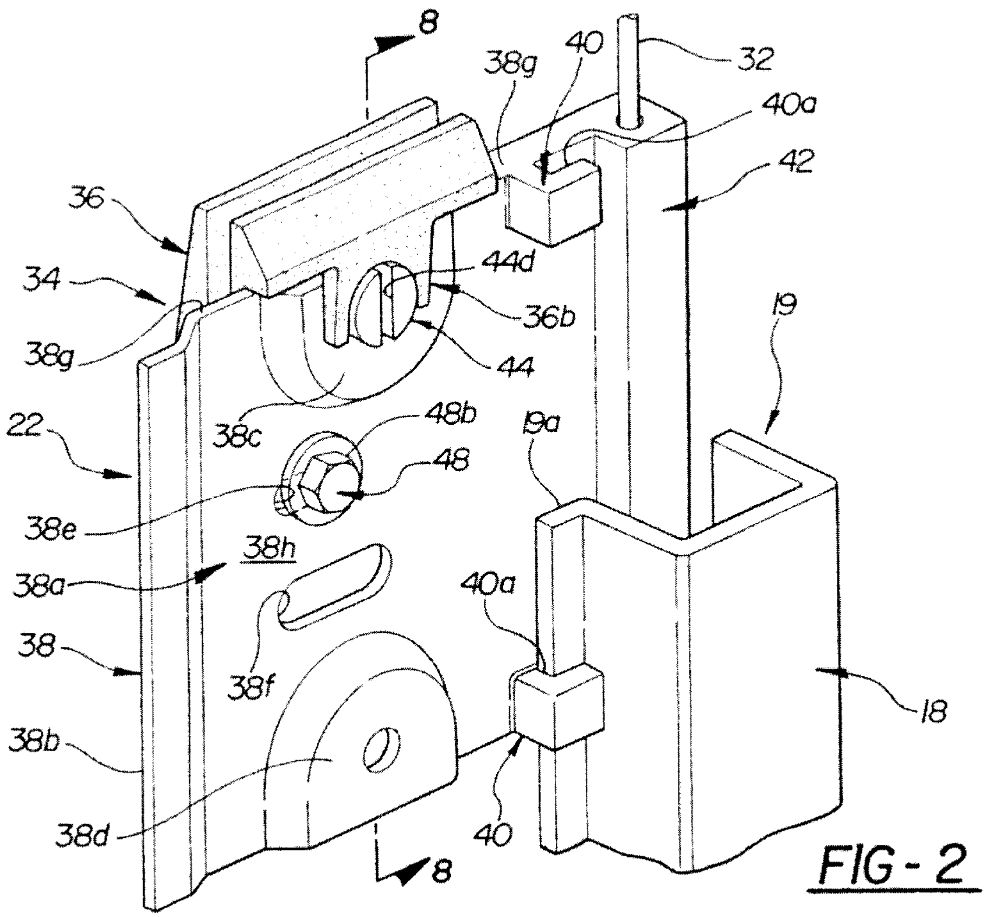
FIG. 2 is a perspective view of a carrier assembly employed in the window regulator of the invention.
Figure 3:
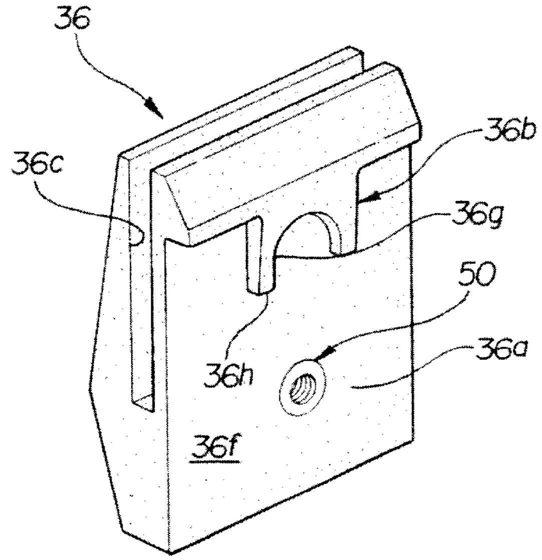
FIG. 3 is a perspective view of a glass clip forming a part of the carrier assembly.
Figure 8:
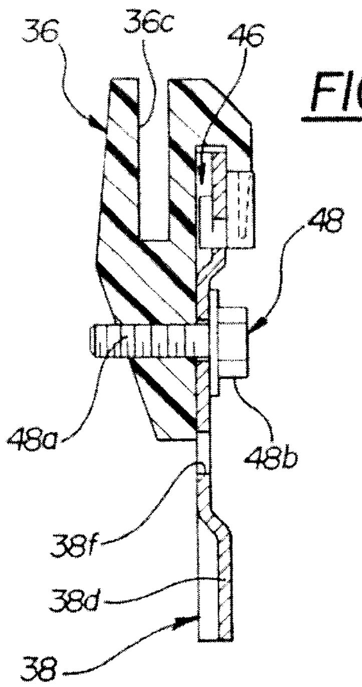
FIG. 8 is a cross sectional view taken on line 8—8 of FIG. 2.

The motor vehicle door 10 seen schematically and fragmentarily in FIG. 1 includes a sash or frame structure **10*a* defining vertical glass guide channels 12 for guiding the opposite side edges 14*a* of a window glass 14 movable upwardly and downwardly in the door by a window regulator mechanism seen somewhat schematically at 16**.

It will be understood that the door may comprise either a side door of a motor vehicle or an end gate, lift gate, or tailgate of a motor vehicle.

It will be further understood that, in the case of a sashless door or gate construction (that is, a door or gate in which there is no upper door or glass framework slidably receiving the raised glass) the side edges 14*a* of the window glass, rather than guiding in channels 12 carried by the sash of the door or gate, guide on and seal against a body seal 17 (FIG. 1A) positioned in the door or gate opening 18 defined by the vehicle body structure.

Window regulator mechanism 16 includes first and second guide rails 19 and 20, first and second carrier assemblies 22 and 24, and drive means 26.

Guide rails 19 and 20 may have a channel configuration as best seen in FIG. 2.

Carrier assemblies 22 and 24 are respectively slidably mounted on guide rails 19 and 20 and are arranged to receive the lower edge 14*b* of window glass 14.

Drive means 26 includes an electric motor 27, a drum housing 28, a drum (not seen) positioned within the drum housing and driven by the motor, pulleys 30, and a cable assembly 32.

A pulley 30 is positioned at the upper and lower ends of each guide rail 19, 20.

Cable assembly 32 comprises cable sections of the Bowden type including an outer casing and an inner core. Cable assembly 32 is wound around the drum within drum housing 28 and around pulleys 30 and is operative in known manner in response to actuation of motor 26 to raise and lower carrier assemblies 22, 24 and thereby raise and lower window glass 14.

First carrier assembly 22 includes a carrier plate structure 34 and a glass clip 36.

Carrier plate structure 34 (FIGS. 2, 4, 5 and 6) includes a carrier plate 38, a rail guide structure 40, a cable attachment structure 42, and a cam member 44.

Carrier plate 38 may be formed of a suitable metallic material and includes a planar main body portion 38*a,* an edge flange portion 38*b,* upper and lower embossed or platform portions 38*c* and 38*d,* and upper and lower slots 38*e* and 38*f* in planar main body portion 38*a*.

Rail guide structure 40 defines a slot 40*a* for sliding receipt of a flange portion 19*a* of the guide channel 19 and cable attachment structure 42 is designed to connect the upper and lower ends of the carrier plate to cable assembly 32. It will be understood that rail guide structure 40 and cable attachment structure 42 are schematically shown and may be formed either as a part of carrier plate 38 or by a separate piece suitably secured to carrier plate 38.

Cam member 44 includes a circular cam portion 44*a,* a circular journal portion 44*b* having a central axis 44*c* that is offset or eccentric with respect to the central axis 44*d* of cam portion 44*a,* and a retainer portion 44*e.*

Cam member 44 is rotatably mounted on carrier plate 38 proximate the upper edge 38*g* of the plate. Specifically, journal portion 44*b* is journaled in a circular aperture 38*h* in embossed portion 38*c* with cam portion 44*a* positioned against the face of embossed portion 38*c* and with retainer portion 44*e* positioned in the space 46 behind embossed portion 38*c* so that cam portion 44*a* may be rotated about the axis of journal portion 44*b* with retainer portion 44*e* precluding inadvertent dislodgement of the cam member from the carrier plate. portion 44*b* with retainer portion 44*e* precluding inadvertent dislodgement of the cam member from the carrier plate.

Glass clip 36 (FIGS. 2, 3, 4, and 7) may be formed of a suitable plastic material and includes a main body portion 36*a* and a stabilizer portion 36*b.* Main body portion 36*a* defines an upwardly opening groove 36*c* sized to fixedly receive the lower edge 14*b* of the window glass (for example as by glueing) and further coacts with stabilizer portion 36*b* to define a downwardly opening groove 36*d.* Groove 36*d* is defined between the rear face 36*e* of the stabilizer portion and the front face 36*f* of the main body portion. A cutout 36*g* is formed in the lower edge 36*h* of the stabilizer portion. Cutout 36*g* includes a semi-circular portion 36*i* having a diameter corresponding generally to the diameter of the cam portion 44*a* of cam member 44.

In the assembled relation of glass clip 36 and carrier plate structure 34, the glass clip is hooked over the upper edge 38*g* of carrier plate 38 with stabilizer portion 36*b* straddling cam portion 44*a* of cam member 44 and with the threaded shaft portion 48*a* of a threaded fastener 48 passing through slot 38*e* and threadably received in a threaded bushing 50 provided in the main body portion 36*a* of the glass clip below stabilizer portion 36*b* and with the head portion 48*b* of the fastener bearing against the front face 38*h* of the carrier plate to fixedly secure the glass clip to the upper edge of the carrier plate. Note that in the assembled relation of the glass clip and the carrier plate structure, the stabilizer portion 36*b* serves not only to preclude cocking of the glass clip relative to the carrier plate but also serves to define the follower surface for coaction with the cam member of the carrier plate structure.

Second carrier assembly 24 includes a carrier plate structure 52 and a glass clip 54.

Carrier plate structure 52 is similar to carrier plate structure 34 with the exception that the cam member 44 is omitted.

Glass clip 54 is essentially identical to glass clip 36.

As with carrier assembly 22, the glass clip fixedly receives the lower edge of the window glass and fits slidably on the upper edge of the carrier plate, and the threaded shaft of a fastener 48 extends through a slot in the carrier plate for threaded engagement with a threaded bushing in the glass clip on the carrier plate.

Operation

Figure 9:
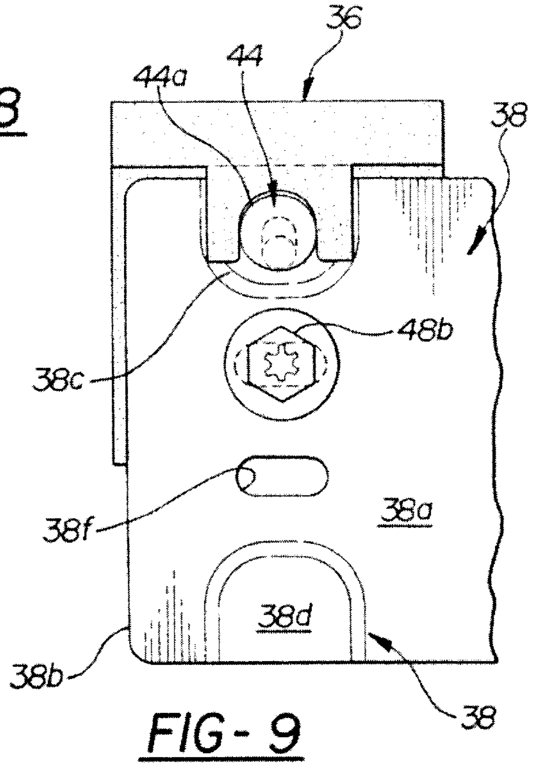
FIGS. 9, 10 and 11 are views showing a central adjustment of the window regulator mechanism, a left adjustment of the window regulator mechanism, and a right adjustment of the window regulator mechanism, respectively.
Figure 10:
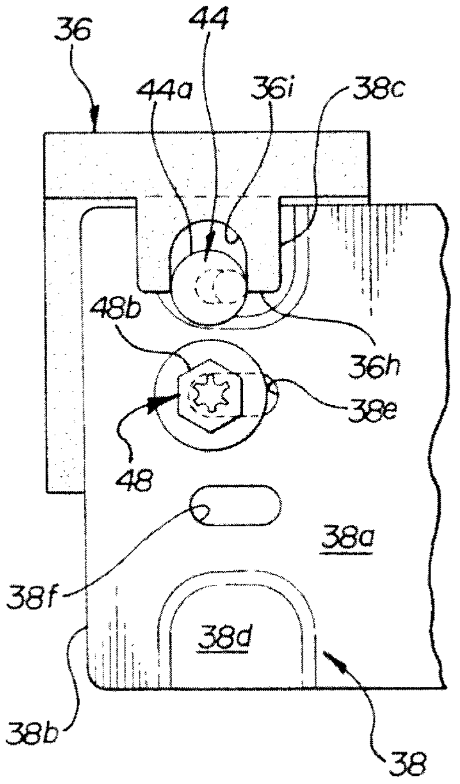
Figure 11:
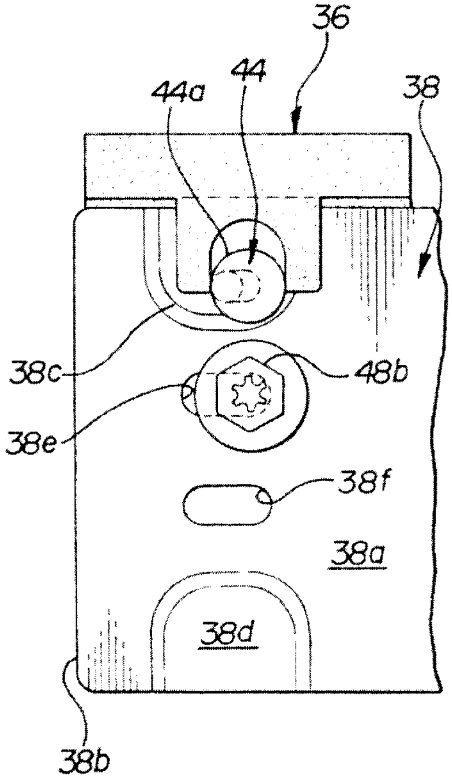

The operation of the invention window regulator mechanism is best seen in FIGS. 9, 10 and 11. The centered disposition of the carrier plate relative to the glass clip is seen in FIG. 9 wherein the circular cam portion 44*a* of the cam member is fully received in the semi-circular portion 36*i* of the cutout 36*g* in the stabilizer portion 36*b* of the glass clip. If this central positioning of the glass clip relative to the carrier plate does not result in satisfactory alignment of the opposite side edges 14*a* of the window glass 14 relative to the door glass guide channels 12, the adjuster mechanism provided in the carrier assembly may be utilized to selectively adjust the glass clips and thereby the window glass relative to the carrier plate 38 and thereby adjust the edges 14*a* of the window glass relative to the door glass guide channels 12 or body glass seal 17.

Specifically, if an adjustment is needed, the fasteners 48 of the carrier assemblies 22 and 24 are loosened sufficiently to allow movement of the shafts 48*a* of the fasteners in the respective slots 38*e* whereafter a screwdriver or other suitable tool is inserted in a slot 44*f* provided in the front face of the cam portion 44*a* of cam member 44 and the cam member is turned about the axis 44*c* of journal portion 44*b*. If a left-hand movement (as viewed in FIGS. 9–11) of the glass clips and window glass is desired, the cam portion 44*a* is turned in a counterclockwise direction about the axis 44*c* of journal portion 44*b* to the position seen in FIG. 10 where it will be seen that the glass clips and window glass (which move as a unit by virtue of the fixed mounting of the lower edge of the window glass in the clips) have moved relative to the carrier plates by a distance corresponding to the distance between the center 44*d* of cam portion 44*a* and the center 44*c* of journal portion 44*b*. Similarly, if a rightward movement of the glass clips and window glass is desired, the cam portion 44*a* is turned in a clockwise direction to the position seen in FIG. 11 wherein the glass clips and window glass have been moved to the right by a distance corresponding to the distance between the center 44*d* of cam portion 44*a* and the center 44*c* of journal portion 44*b*. Following the adjustment in either case, the fasteners 48 are again tightened to secure the glass clips in their adjusted position. Although absolute or finite positions of leftward and rightward adjustment are shown in FIGS. 10 and 11, it will be apparent that the adjustment system of the invention is infinitely variable between the extreme left position seen in FIG. 10 and the extreme right position seen in FIG. 11 so that any position of adjustment between the illustrated extremes may be readily attained and secured by tightening of the fasteners 48.

Note that by virtue of the upper and lower embossed portions 38*c* and 38*d*, the carrier assembly is reversible from left to right. That is, the carrier assembly 22 seen as constituting the left carrier assembly as viewed in FIG. 1 may be utilized as the right carrier assembly 24 as viewed in FIG. 1 simply by removing the glass clip, moving the cam member to an aperture in the lower embossment 38*d* of the carrier plate (which now becomes the upper embossment) and replacing the glass clip over the edge of the carrier plate proximate embossment 38*d* which now becomes the upper edge of the carrier plate with the fastener 48 now passing through slot 38*f* for securement in threaded bushing 50.

Figure 12:
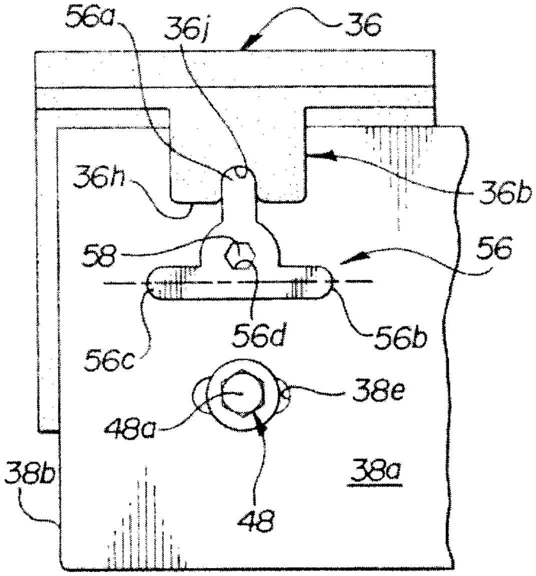
FIG. 12, is a front elevational view of an alternate embodiment of the window regulator mechanism.
Figure 13:
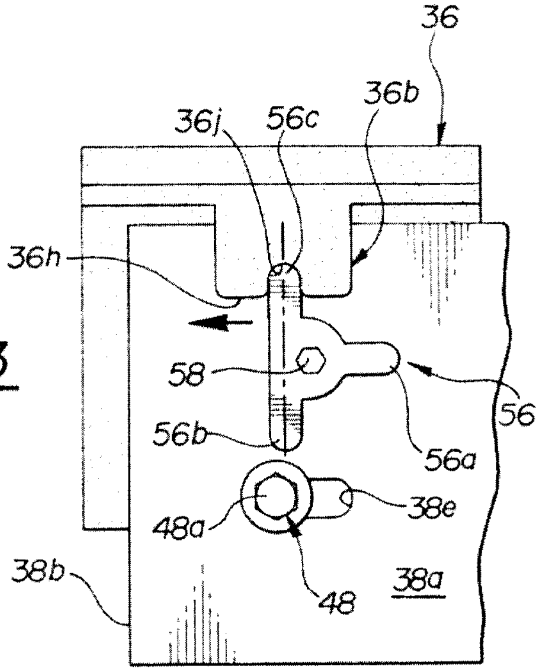
FIGS. 13 and 14 show right and left adjustments, respectively, of the alternate embodiment of FIG. 12.
Figure 14:
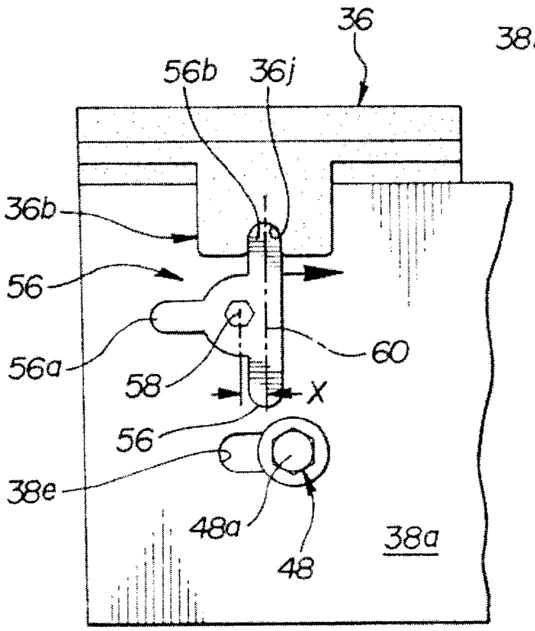

In the alternate embodiment of the invention seen in FIGS. 12–14, cam member 44 is replaced with a three prong cam member 56 journaled on carrier plate 38 for rotation about an axis 58 and coacting with a follower notch 36*j* in the lower edge 36*h* of the stabilizer portion 36*b* of the glass clip. Each of the three prongs 56*a*, 56*b* and 56*c* of the cam member 56 is sized to fit in the notch 36*j*. To move the glass clip and thereby the window glass to the left or right, and as seen respectively in FIGS. 13 and 14, fasteners 48 are loosened to an extent to totally remove the fastener shaft portions 48*a* from the threaded bushings 50 whereafter the glass clip 36 is lifted off of the upper edge of the carrier plate, a suitable tool is inserted in the hex opening 56*d* of the cam member, the cam member is rotated either clockwise or counterclockwise to bring either the prong 56*b* or the prong 56*c* into a vertical orientation, the clip is replaced on the upper edge of the carrier plate to position the respective prongs 56*b*, 56*c* in the notch 36*j*, and the fasteners are threaded back into the threaded bushings 50 to secure the glass clip in its adjusted position. In the case of either clockwise or counterclockwise rotation, the glass clip is moved laterally on the carrier plate by a distance equal to the distance X between the axis of rotation 58 and the geometric center line 60 of prongs 56*b* and 56*c*. Note that, as compared to the embodiment of FIGS. 1–11, the embodiment of FIGS. 12–14 provides for only three finite positions of adjustment, and adjustment of the cam member requires total unthreading of the fastener 48 from the threaded bushing 50 and lifting of the glass clip off of the upper edge of the carrier plate.

It will be seen that the invention provides a simple and effective means of readily adjusting the lateral position of the glass clips, and thereby of the window glass carried thereby, to compensate for manufacturing tolerances in the spacing and disposition of the door glass guide channels or the body seal. That is, the invention provides a window regulator mechanism which includes a fine glass adjustment mechanism to compensate for build variations with respect to the vehicle body whereby provide a net build location.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, although the invention has been described in association with the specific cam arrangements shown in the FIGS. 1–11 and 12–14 embodiments, it will be understood that the invention may be carried out utilizing any cam member having a geometric center that deviates from the axis of rotation of the cam member whereby circumferentially spaced peripheral points on the cam member may be utilized in association with a coacting surface on the associated glass clip to selectively move the glass clip laterally with respect to the carrier plate.

What is claimed is:

1. A motor vehicle window regulator mechanism for moving a window glass upwardly and downwardly with respect to a vehicle door, the regulator mechanism including first and second spaced vertical guide rails, first and second carrier plate structures slidably mounted on a respective one of said first and second guide rails, a drive mechanism operative to move the carrier plate structures upwardly and downwardly on the guide rails, and first and second glass clips carried by a respective one of the first and second carrier plate structures and adapted to receive a lower edge of the window glass whereby to raise and lower the window glass in response to upward and downward movement of the carrier plate structures, characterized in that:

the regulator mechanism further includes a cam member having a circular journal portion journaled in one of the first glass clip and first carrier plate structure and a cam portion eccentric with respect to a central axis of the journal portion, and a generally U-shaped coacting surface defined on the other of the first glass clip and first carrier plate structure;

the cam member is mounted on said one of said first glass clip and said first carrier plate structure for rotation about the central axis of the journal portion; and the cam portion of the cam member and the coacting surface coact in response to rotation of the cam member about the central axis of the journal portion to move the first glass clip laterally with respect to the first carrier plate structure.

2. A window regulator mechanism according to claim 1 wherein the cam member is mounted for rotation on the first carrier plate structure and the coacting surface is defined on the first glass clip.

3. A motor vehicle window regulator mechanism for moving a window glass upwardly and downwardly with respect to a vehicle door, the regulator mechanism including first and second spaced vertical guide rails, first and second carrier plate structures mounted on a respective one of said guide rails, and a drive mechanism operative to move the carrier plate structures upwardly and downwardly on the guide rails, characterized in that:

each carrier plate structure receives a respective glass clip for receiving a lower edge of the window glass whereby to raise and lower the window glass in response to upward and downward movement of the carrier plate structures; and one of the carrier plate structures includes a cam member having a circular journal portion journaled in the one carrier plate structure and a cam portion eccentric with respect to a central axis of the journal portion, the cam member mounted on the one carrier plate structure for rotation about the central axis of the journaled portion, the cam portion of the cam member coacting with a generally U-shaped surface on the respective glass clip and operative in response to rotation of the cam member on the one carrier plate structure about the axis of the journal portion to move the respective glass clip laterally with respect to the one carrier plate structure.

4. A motor vehicle window regulator mechanism according to claim 3 wherein:

the one carrier plate structure includes a carrier plate having an upper edge adapted to mount the respective glass clip; and the cam member is rotatably mounted on the carrier plate proximate the upper edge thereof.

5. A motor vehicle window regulator mechanism according to 4 wherein the carrier plate includes a horizontally extending slot positioned below the cam member and adapted to receive a shaft of a fastener secured to the respective glass clip to accommodate and guide the lateral movement of the respective glass clip relative to the carrier plate.

6. A carrier assembly for use with a motor vehicle window regulator for moving a window glass upwardly and downwardly with respect to a vehicle door, the carrier assembly comprising a glass clip for receiving a lower edge of the window glass and a carrier plate structure including a carrier plate having an upper edge slidably mounting the glass clip and a cam member having a circular journal portion journaled in the plate proximate the upper edge thereof and a cam portion eccentric with respect to a central axis of the journal portion, the cam member mounted on the carrier plate for rotation about the central axis of the journal portion, the cam portion coacting with a generally U-shaped surface on the glass and operative in response to rotation of the cam member on the plate about the axis of the journal portion to move the glass clip laterally with respect to the carrier plate.

7. A carrier assembly according to claim 6 wherein the carrier plate includes a horizontal slot positioned below the cam member and adapted to receive a shaft of a fastener member secured to the glass clip to accommodate and guide the lateral movement of the glass clip relative to the carrier plate.

8. A motor vehicle window regulator mechanism for moving a window glass upwardly and downwardly with respect to a vehicle door, the window regulator mechanism comprising:

first and second spaced vertical guide rails;

first and second carrier plates respectively slidably mounted on the first and second rails;

first and second glass clips slidably mounted on an upper edge of a respective one of said first and second carrier plates and adapted to fixedly receive a lower edge of the window glass; and a cam member journaled on the first carrier plate for rotation about an axis of rotation and having a geometric center that deviates from the axis of rotation wherein rotation of said cam member about said axis of rotation causes circumferentially spaced peripheral points on the cam member in association with a generally U-shaped coacting surface on the first glass clip to move the first glass clip laterally with respect to the guide rails.

9. A motor vehicle window regulator mechanism according to claim 8 wherein the cam member includes a circular cam portion received in the first glass clip and a journal portion rotatably mounted on the first carrier plate.

10. A motor vehicle window regulator mechanism for moving a window glass upwardly and downwardly with respect to a vehicle door, the regulator mechanism including first and second spaced vertical guide rails, first and second carrier plate structures slidably mounted on a respective one of said first and second guide rails, drive means for moving the carrier plate structures upwardly and downwardly on the guide rails, and first and second glass clips carried by a respective one of said first and second carrier plate structures and adapted to receive a lower edge of the window glass whereby to raise and lower the window glass in response to upward and downward movement of the carrier plate structures, characterized in that:

the regulator mechanism further includes a rotary cam member mounted for rotation on the first carrier plate structure, and a coacting surface defined on the first glass clip;

the cam member and coacting surface coact in response to rotation of the cam member to move the first glass clip laterally with respect to the first carrier plate structure;

the first carrier plate structure includes a carrier plate;

the first glass clip defines an upwardly opening groove for receiving the lower edge of the window glass and a downwardly opening groove for receiving an upper edge of the carrier plate;

the upwardly opening groove is defined by a main body portion of the first glass clip and the downwardly opening groove is defined by a surface of the main body portion and a stabilizer portion extending downwardly and in parallel relation to the main body portion surface; and the coacting surface is defined on the stabilizer portion.

11. A window regulator mechanism according to claim 10 wherein the coacting surface has an inverted U configuration and is defined by a cutout formed in a lower edge of the stabilizer portion.

12. A window regulator mechanism according to claim 11 wherein at least a part of the cam member is fitted in the cutout.

13. A window regulator mechanism according to claim 12 wherein the regulator mechanism further includes a fastener having a shaft portion received in an aperture in one of the first glass clip and first carrier plate structure and passing through a slot in the other of the first glass clip and first carrier plate structure.

14. A window regulator mechanism according to claim 13 wherein a shaft portion of a fastener passes through a slot in the first carrier plate structure for threaded receipt in a threaded aperture in the main body portion of the first glass clip.

15. A motor vehicle window regulator mechanism for moving a window glass upwardly and downwardly with respect to a vehicle door, the window regulator mechanism comprising:

first and second spaced vertical guide rails;

first and second carrier plates respectively slidably mounted on the first and second rails;

first and second glass clips slidably mounted on an upper edge of a respective carrier plate and adapted to fixedly receive a lower edge of the window glass; and a cam member including a circular cam portion received in a cutout in the first glass clip and a journal portion rotatably mounted on the first carrier plate and offset from a geometric center of the cam portion wherein rotation of said cam portion causes circumferentially spaced peripheral points on the cam portion in association with a coacting surface on the first glass clip to move the first glass clip laterally with respect to the guide rails;

each clip defining an upwardly opening groove for receiving the lower edge of the window glass and a downwardly opening groove for receiving the upper edge of the respective carrier plate;

the upwardly opening groove of each clip being defined by a main body portion of the clip and the downwardly opening groove of each clip being by a surface of the main body portion and a stabilizer portion extending downwardly in spaced parallel relation to the main body portion surface; and the cutout receiving the cam portion of the cam member being constituted by a cutout in a lower edge of the stabilizer portion of the first clip.

16. A motor vehicle window regulator mechanism according to claim 15 wherein the window regulator mechanism further includes first and second threaded fasteners, each fastener including a threaded shaft portion passing through a slot in a respective one of said plates carrier plates for threaded engagement in a threaded aperture in a respective one of said glass clips.

* * * * *